(12) United States Patent
Woodbine et al.

(10) Patent No.: US 11,075,995 B2
(45) Date of Patent: *Jul. 27, 2021

(54) SYSTEM AND METHOD FOR MANAGING CONCENTRATE USAGE OF A USER

(71) Applicant: GoFire, Inc., Denver, CO (US)

(72) Inventors: John Jesse Woodbine, Louisville, CO (US); Peter William Calfee, Denver, CO (US); Christopher Bennett Carter, Atlanta, GA (US); Gary Ross Mitchell, Lyons, CO (US); William F. Demyanovich, Lyons, CO (US)

(73) Assignee: GoFire, Inc., Wheat Ridge, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/592,674

(22) Filed: Oct. 3, 2019

(65) Prior Publication Data
US 2020/0046032 A1 Feb. 13, 2020

Related U.S. Application Data

(63) Continuation of application No. 15/391,829, filed on Dec. 27, 2016.

(51) Int. Cl.
*A24F 40/53* (2020.01)
*A24F 40/65* (2020.01)
(Continued)

(52) U.S. Cl.
CPC ............. *H04L 67/12* (2013.01); *A24F 40/42* (2020.01); *A24F 40/50* (2020.01); *A24F 40/53* (2020.01);
(Continued)

(58) Field of Classification Search
CPC ..... A24F 47/008; H04L 67/12; H04L 67/306; H04W 4/80
See application file for complete search history.

(56) References Cited

U.S. PATENT DOCUMENTS

| | | |
|---|---|---|
| 4,934,358 A | 6/1990 | Nilsson et al. |
| 4,947,875 A | 8/1990 | Brooks et al. |

(Continued)

FOREIGN PATENT DOCUMENTS

| | | |
|---|---|---|
| EP | 2399636 | 12/2011 |
| EP | 2207528 | 10/2013 |

(Continued)

*Primary Examiner* — Kevin R Kruer
(74) *Attorney, Agent, or Firm* — Daniel W. Roberts; Law Office of Daniel W. Roberts, LLC (57) ABSTRACT

A system comprising a vaporizing device and a central server is described. The vaporizing device includes a housing and a cartridge, received within the housing, the cartridge including a predefined quantity of concentrate and an identification code associated with the concentrate and uniquely identifying the cartridge. The vaporizing device further includes a control unit configured to read the identification code. The vaporizing device further includes a communication unit configured to transmit the identification code to a computing device of a user. The central server includes a database. The central server is configured to receive the identification code from the computing device and retrieve concentrate information corresponding to the identification code from the database. The central server is configured to transmit the concentrate information to the computing device for displaying to the user.

25 Claims, 7 Drawing Sheets

(51) Int. Cl.
  *A24F 40/42* (2020.01)
  *A24F 40/50* (2020.01)
  *A24F 40/10* (2020.01)
  *A24F 40/48* (2020.01)
  *H04L 29/08* (2006.01)
  *H04W 4/80* (2018.01)

(52) U.S. Cl.
  CPC .............. *A24F 40/65* (2020.01); *A24F 40/10* (2020.01); *A24F 40/48* (2020.01); *H04L 67/306* (2013.01); *H04W 4/80* (2018.02)

(56) References Cited

U.S. PATENT DOCUMENTS

| | | | |
|---|---|---|---|
| 5,284,133 | A | 2/1994 | Burns et al. |
| 6,024,097 | A * | 2/2000 | Von Wielligh ........ A24F 47/002 |
| | | | 131/270 |
| 6,772,756 | B2 | 8/2004 | Shayan |
| 6,814,083 | B2 | 11/2004 | Likness et al. |
| 7,088,914 | B2 | 8/2006 | Whittle et al. |
| 7,164,993 | B2 | 1/2007 | Likness et al. |
| 7,540,286 | B2 | 6/2009 | Cross et al. |
| 8,464,706 | B2 * | 6/2013 | Crockford ............... A61P 11/06 |
| | | | 128/200.14 |
| 8,550,069 | B2 | 10/2013 | Alelov |
| 8,602,037 | B2 | 12/2013 | Inagaki |
| 8,851,068 | B2 | 10/2014 | Cohen et al. |
| 8,897,628 | B2 | 11/2014 | Conley et al. |
| 8,899,239 | B2 | 12/2014 | Hon |
| 8,910,630 | B2 | 12/2014 | Todd |
| 9,220,294 | B2 | 12/2015 | McCullough |
| 9,320,301 | B2 | 4/2016 | Memari et al. |
| 9,380,813 | B2 | 7/2016 | McCullough |
| 9,462,832 | B2 * | 10/2016 | Lord .................... H05B 1/0244 |
| 9,763,478 | B2 * | 9/2017 | Cameron ................ F01K 5/00 |
| 9,770,055 | B2 * | 9/2017 | Cameron ........... H04M 1/7253 |
| 9,854,842 | B2 * | 1/2018 | Liu ........................ A61M 15/06 |
| 9,936,736 | B2 * | 4/2018 | Cameron .............. A24F 47/008 |
| 9,968,136 | B1 * | 5/2018 | Bell ........................ H05B 1/0244 |
| 10,039,327 | B2 * | 8/2018 | Cameron ................ H05B 3/12 |
| 10,065,005 | B2 * | 9/2018 | Wilder .................... A24F 40/48 |
| 10,098,387 | B2 * | 10/2018 | Manca .................... A24F 40/60 |
| 10,117,460 | B2 * | 11/2018 | Sears ..................... A24F 40/53 |
| 10,178,880 | B2 * | 1/2019 | Dubief .................... B01F 15/06 |
| 10,244,791 | B2 * | 4/2019 | Cameron .............. A24F 47/002 |
| 10,285,449 | B2 * | 5/2019 | Murison .............. A61M 11/042 |
| 10,349,675 | B2 * | 7/2019 | Choukroun ........... A24F 47/008 |
| 10,426,196 | B2 * | 10/2019 | Calfee .................. A61M 15/06 |
| 2008/0138051 | A1 * | 6/2008 | Velazquez ................ A61L 9/02 |
| | | | 392/395 |
| 2013/0199528 | A1 | 8/2013 | Goodman ............. A24F 47/008 |
| | | | 128/203.26 |
| 2013/0340775 | A1 * | 12/2013 | Juster .................... A24F 47/008 |
| | | | 131/273 |
| 2014/0116455 | A1 * | 5/2014 | Youn .................... A24F 47/008 |
| | | | 131/329 |
| 2014/0202477 | A1 * | 7/2014 | Qi .......................... H04W 4/60 |
| | | | 131/329 |
| 2014/0243749 | A1 | 8/2014 | Edwards et al. |
| 2014/0278250 | A1 | 9/2014 | Smith et al. |
| 2014/0345633 | A1 | 11/2014 | Talon et al. |
| 2014/0345635 | A1 | 11/2014 | Rabinowitz et al. |
| 2015/0039591 | A1 | 2/2015 | Ding et al. |
| 2015/0053217 | A1 | 2/2015 | Steingraber et al. |
| 2015/0136158 | A1 | 5/2015 | Stevens et al. |
| 2015/0142387 | A1 * | 5/2015 | Alarcon ................ G16H 40/63 |
| | | | 702/187 |
| 2015/0181945 | A1 | 7/2015 | Tremblay |
| 2015/0245660 | A1 | 9/2015 | Lord |
| 2015/0272220 | A1 | 10/2015 | Spinka et al. |
| 2015/0327596 | A1 | 11/2015 | Alarcon et al. |
| 2015/0332379 | A1 * | 11/2015 | Alarcon ................ A61M 15/06 |
| | | | 705/26.81 |
| 2015/0366266 | A1 | 12/2015 | Shabat |
| 2016/0007651 | A1 | 1/2016 | Ampolini et al. |
| 2016/0021930 | A1 | 1/2016 | Minskoff et al. |
| 2016/0089508 | A1 | 3/2016 | Smith et al. |
| 2016/0106936 | A1 | 4/2016 | Kimmel |
| 2016/0143361 | A1 * | 5/2016 | Juster .................... H05B 1/0244 |
| | | | 392/404 |
| 2016/0157524 | A1 | 6/2016 | Bowen et al. |
| 2016/0171164 | A1 * | 6/2016 | Kinzer .................. G16H 10/20 |
| | | | 705/3 |
| 2016/0200463 | A1 | 7/2016 | Hodges et al. |
| 2016/0211693 | A1 | 7/2016 | Stevens et al. |
| 2016/0219932 | A1 | 8/2016 | Glaser |
| 2016/0219933 | A1 | 8/2016 | Henry, Jr. et al. |
| 2016/0219938 | A1 | 8/2016 | Mamoun et al. |
| 2016/0278435 | A1 * | 9/2016 | Choukroun ........... A24F 47/008 |
| 2016/0309784 | A1 | 10/2016 | Silvestrini et al. |
| 2016/0309789 | A1 * | 10/2016 | Thomas, Jr. ........ A61M 15/002 |
| 2016/0331025 | A1 * | 11/2016 | Cameron ............. G06F 19/3418 |
| 2016/0331027 | A1 | 11/2016 | Cameron |
| 2016/0331913 | A1 | 11/2016 | Bourque |
| 2016/0331915 | A1 * | 11/2016 | Goodman ............. A61M 15/06 |
| 2016/0337141 | A1 * | 11/2016 | Cameron .............. H04L 51/32 |
| 2016/0337362 | A1 * | 11/2016 | Cameron .......... A61M 15/0021 |
| 2016/0356751 | A1 | 12/2016 | Blackley |
| 2016/0360790 | A1 * | 12/2016 | Calfee .................. H05B 3/0014 |
| 2016/0363570 | A1 | 12/2016 | Blackley |
| 2016/0363917 | A1 * | 12/2016 | Blackley ............ G06Q 30/0601 |
| 2017/0014582 | A1 * | 1/2017 | Skoda ................... A24F 40/30 |
| 2017/0046357 | A1 * | 2/2017 | Cameron ............. A24F 47/008 |
| 2017/0064994 | A1 * | 3/2017 | Xu ........................ B65D 25/08 |
| 2017/0105449 | A1 * | 4/2017 | Hearn .................. B67D 7/0294 |
| 2017/0172210 | A1 * | 6/2017 | Bright .................. H05B 1/0244 |
| 2017/0258142 | A1 * | 9/2017 | Hatton ................. H05B 1/0244 |
| 2017/0266397 | A1 * | 9/2017 | Mayle .................. A61M 11/042 |
| 2017/0303593 | A1 * | 10/2017 | Cameron ............. H05B 1/0227 |
| 2017/0332702 | A1 * | 11/2017 | Cameron ............. A24B 15/167 |
| 2018/0117268 | A1 * | 5/2018 | Selby .................... A24F 47/008 |
| 2018/0177231 | A1 * | 6/2018 | Woodbine .............. A24F 47/008 |
| 2018/0272083 | A1 * | 9/2018 | Avots .................... A24F 47/008 |
| 2018/0280637 | A1 * | 10/2018 | Mayle ............... A61M 15/0048 |
| 2018/0296778 | A1 * | 10/2018 | Hacker ................. A61M 11/042 |
| 2019/0027240 | A1 * | 1/2019 | Davidson ............... G16H 20/10 |
| 2019/0090546 | A1 * | 3/2019 | Cameron ............. A24F 47/008 |
| 2019/0090547 | A1 * | 3/2019 | Cameron ............. A61K 9/0073 |
| 2019/0246591 | A1 * | 8/2019 | Leo ........................ A01G 22/15 |
| 2019/0246691 | A1 * | 8/2019 | McCoy .................... A24D 1/14 |
| 2019/0289908 | A1 * | 9/2019 | Worm .................... A61M 15/06 |
| 2019/0289909 | A1 * | 9/2019 | Hejazi ................. A61M 15/0003 |
| 2019/0289915 | A1 * | 9/2019 | Heidl ..................... G06F 3/017 |
| 2019/0321572 | A1 * | 10/2019 | Stalder ................ B05B 11/0097 |
| 2019/0335812 | A1 * | 11/2019 | Ampolini ............... A61M 15/06 |
| 2020/0022416 | A1 * | 1/2020 | Alarcon ............. A61M 15/0028 |
| 2020/0022420 | A1 * | 1/2020 | Memari .................... A24F 15/12 |
| 2020/0037662 | A1 * | 2/2020 | Richmond ............. A24D 1/14 |
| 2020/0037670 | A1 * | 2/2020 | Fenner, Jr. ............. A24F 40/48 |
| 2020/0037671 | A1 * | 2/2020 | Minskoff ............. H05B 1/0244 |
| 2020/0046030 | A1 * | 2/2020 | Krietzman ............. A24F 47/008 |
| 2020/0046032 | A1 * | 2/2020 | Woodbine ............. A24F 47/008 |

FOREIGN PATENT DOCUMENTS

| | | |
|---|---|---|
| EP | 3099363 | 12/2016 |
| EP | 3102266 | 12/2016 |
| GB | 2524779 | 10/2015 |
| KR | 2015065072 | 6/2015 |
| WO | WO03097141 | 11/2003 |
| WO | WO2016009202 | 1/2016 |
| WO | WO2016050247 | 4/2016 |
| WO | WO2016064906 | 4/2016 |
| WO | WO2016172802 | 11/2016 |
| WO | WO2016187695 | 12/2016 |

* cited by examiner

SYSTEM AND METHOD FOR MANAGING CONCENTRATE USAGE OF A USER

CROSS-REFERENCE TO RELATED APPLICATION

The present invention is a continuation of U.S. patent application Ser. No. 15/391,829 filed Dec. 27, 2016, now U.S. Pat. No. 10,834,967, and incorporated herein by reference. This continuing application claims the benefit of U.S. patent application Ser. No. 15/391,829.

FIELD OF DISCLOSURE

The invention relates to a system and method for managing and optimizing concentrate usage of a user and more particularly, to a vaporizing device therefor.

BACKGROUND OF DISCLOSURE

Vaporizing devices are used for medical and recreational reasons. For initiating a vaping session, a user may operate a vaporizing device to load a desired quantity of a concentrate into a vaporization chamber of the vaporizing device. The vaporizing device may include a heating element located in the vaporization chamber, which may be in direct contact with the concentrate and heats up the concentrate by conduction. Subsequently, the concentrate is vaporized in the vaporization chamber, thus producing fumes for the user to inhale. Generally, the mechanisms for loading the concentrate are complex to operate, and as a result, the user may end up consuming erratic quantity of the concentrate in some vaping sessions. Furthermore, the user is typically unaware of the concentrate being used owing to lack of availability of information related to the concentrate.

Therefore, there is a need of a system which enables the user to administer the concentrate in desired dosages, and further manages, logs, tracks and/or monitors the concentrate usage of the user.

SUMMARY OF THE DISCLOSURE

In one aspect of the present disclosure, a system for managing concentrate usage of a user is described. The system includes a vaporizing device and a central server. The vaporizing device includes a housing and a cartridge received within the housing. The cartridge includes a predefined quantity of concentrate and an identification code associated with the concentrate. The vaporizing device further includes a control unit disposed within the housing. The control unit is configured to read the identification code. The vaporizing device further includes a communication unit coupled to the control unit. The communication unit is configured to transmit the identification code to a computing device of a user. The central server includes a database, having a plurality of identification codes and corresponding concentrate information. The central server is configured to receive the identification code from the computing device and retrieve concentrate information corresponding to the identification code from the database. The central server is further configured to transmit the concentrate information to the computing device for displaying to the user.

In another aspect of the present disclosure, a method for managing concentrate usage of a user is described. The method includes reading, by a vaporizing device, an identification code associated with a concentrate. The method further includes, transmitting the identification code to a computing device of a user. Further, the method includes receiving, by a central server, the identification code from the computing device. The central server includes a database having a plurality of identification codes and corresponding concentrate information. The method further includes retrieving concentrate information corresponding to the identification code from the database. Further, the method includes transmitting the concentrate information to the computing device for displaying to the user.

In yet another aspect of the present disclosure, a vaporizing device is described. The vaporizing device includes a housing and a cartridge received within the housing. The cartridge includes a predefined quantity of concentrate and an identification code associated with the concentrate. The vaporizing device further includes a dosing unit located in the housing and operatively coupled with the cartridge. The dosing unit is configured to extrude the concentrate from the cartridge. The vaporizing device further includes a vaporization chamber defined in the housing and in fluid communication with the cartridge. The vaporization chamber is configured to collect the concentrate extruded from the cartridge. The vaporizing device further includes a heating element in thermal communication with the vaporization chamber. The heating element is configured to generate heat energy to vaporize the concentrate in the vaporization chamber. The vaporizing device further includes a control unit disposed within the housing and configured to read the identification code from the cartridge. The control unit is further configured to control the heat energy generated by the heating element based on the identification code of the cartridge.

In yet another aspect of the present disclosure, a method of administering a concentrate to a user using a vaporizing device is described. The method includes receiving a cartridge in the vaporizing device. The cartridge includes a predefined quantity of the concentrate and an identification code associated with the concentrate. The method further includes reading the identification code from the cartridge. Further, the method includes extruding the concentrate from the cartridge into a vaporization chamber of the vaporizing device. The method further includes vaporizing the concentrate in the vaporization chamber based on the identification code.

BRIEF DESCRIPTION OF THE DRAWINGS

While the specification concludes with claims particularly pointing out and distinctly claiming particular embodiments of the instant invention, various embodiments of the invention can be more readily understood and appreciated from the following descriptions of various embodiments of the invention when read in conjunction with the accompanying drawings in which:

DETAILED DESCRIPTION

Reference will now be made in detail to specific embodiments or features, examples of which are illustrated in the accompanying drawings. Wherever possible, corresponding or similar reference numbers will be used throughout the drawings to refer to the same or corresponding parts. Moreover, references to various elements described herein, are made collectively or individually when there may be more than one element of the same type. However, such references are merely exemplary in nature. It may be noted that any reference to elements in the singular may also be construed to relate to the plural and vice-versa without limiting the scope of the disclosure to the exact number or type of such elements unless set forth explicitly in the appended claims.

Figure 1:
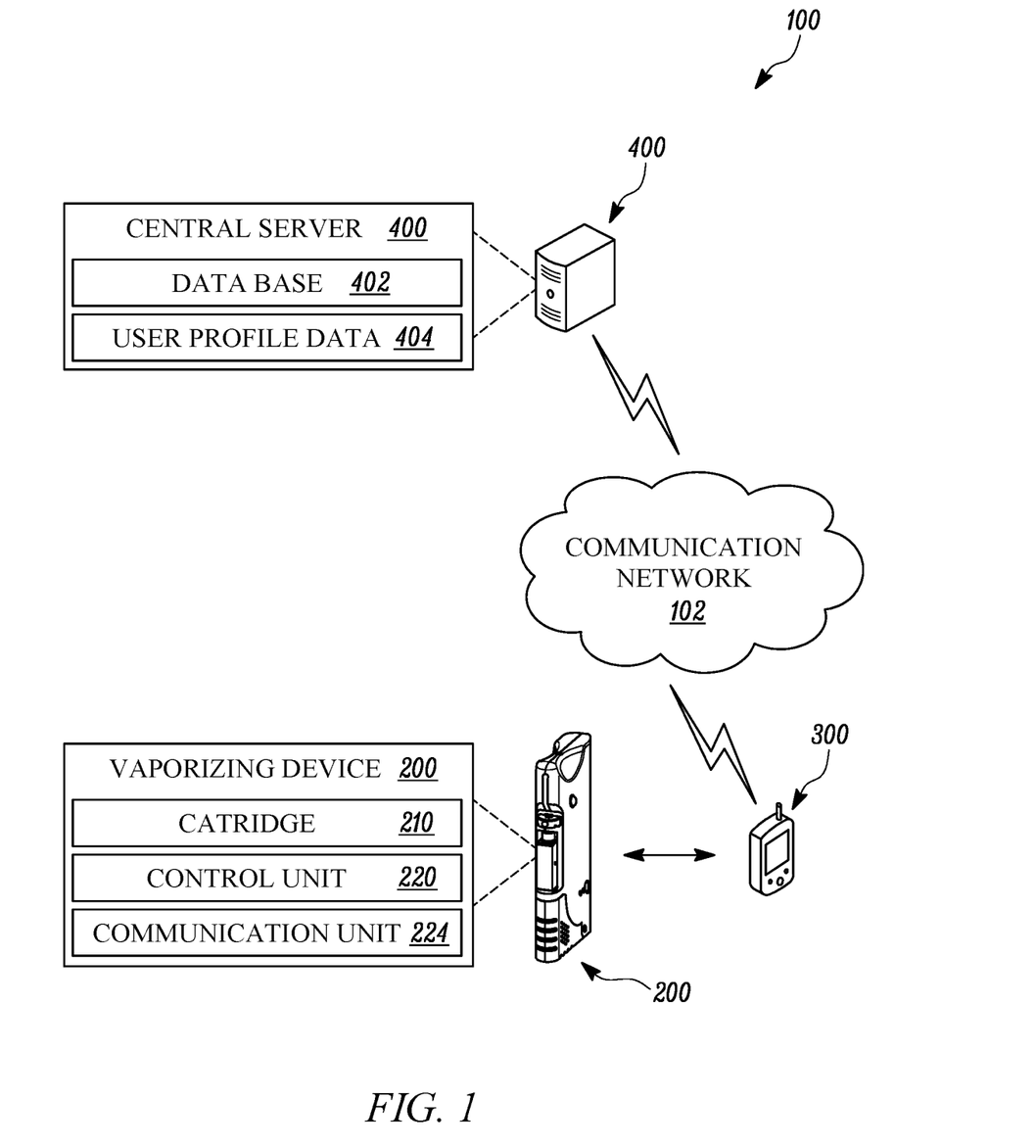
FIG. 1 illustrates a system for managing concentrate usage of a user, in accordance with an embodiment of the present disclosure.

Referring to FIG. 1, a block diagram of a system 100 for managing concentrate usage of a user is illustrated, in accordance with an embodiment of the present disclosure. The system 100 may be a public network environment including a plurality of personal computers, laptops, various servers, such as blade servers, and other computing devices. In another implementation, the system 100 may be a private network environment with a limited number of computing devices, such as personal computers, servers, laptops, and/or communication devices, such as mobile phones and smart phones. The system 100 includes a vaporizing device 200, a computing device 300 and a central server 400, working in conjunction with each other. The system 100 integrates the vaporizing device 200 with the computing device 300 and the central server 400, to manage the concentrate usage in the vaporizing device 200 according to defined operational parameters, as described in the following description.

Figure 2:
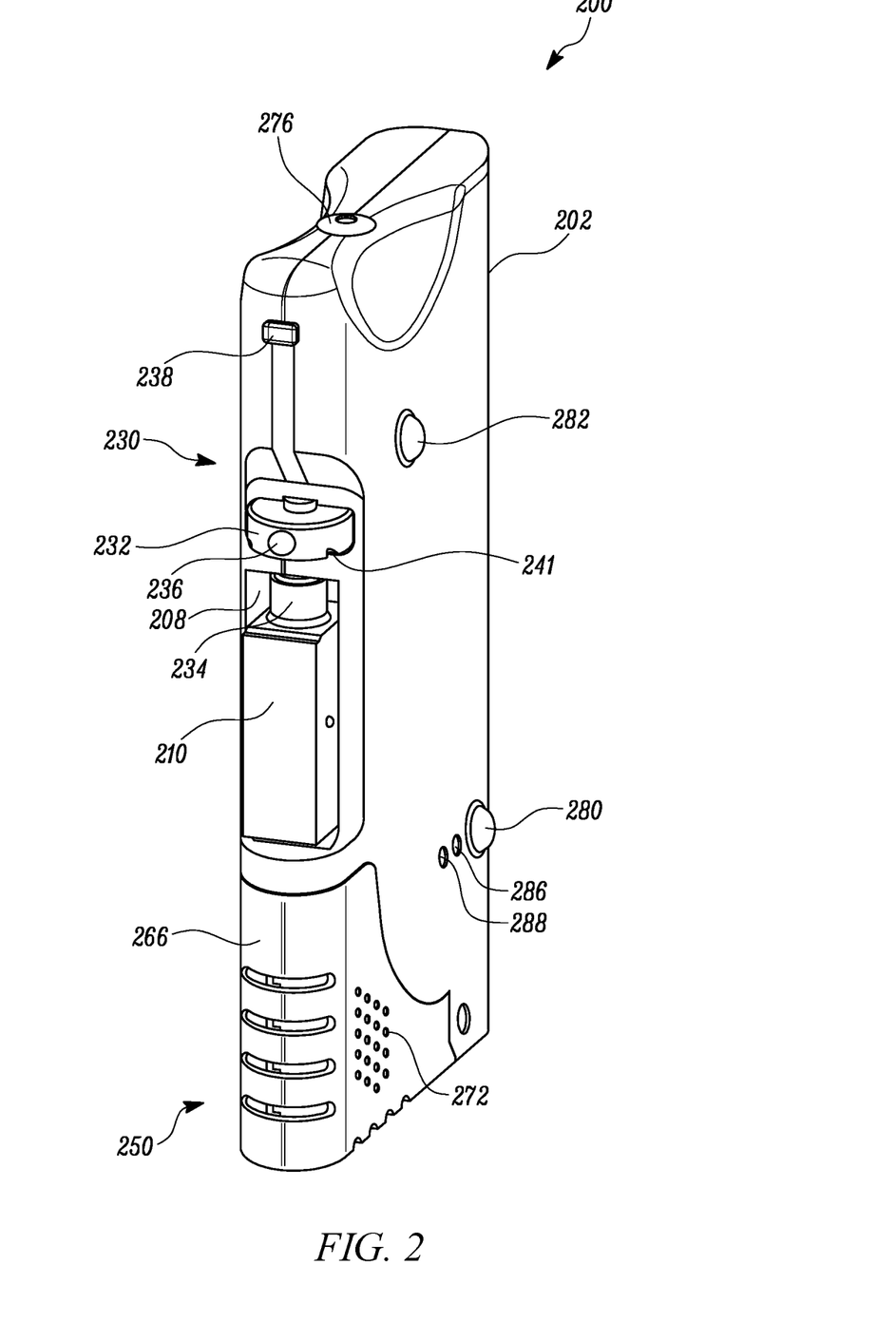
FIG. 2 is a side perspective view of a vaporizing device, in accordance with an embodiment of the present disclosure.
Figure 3:
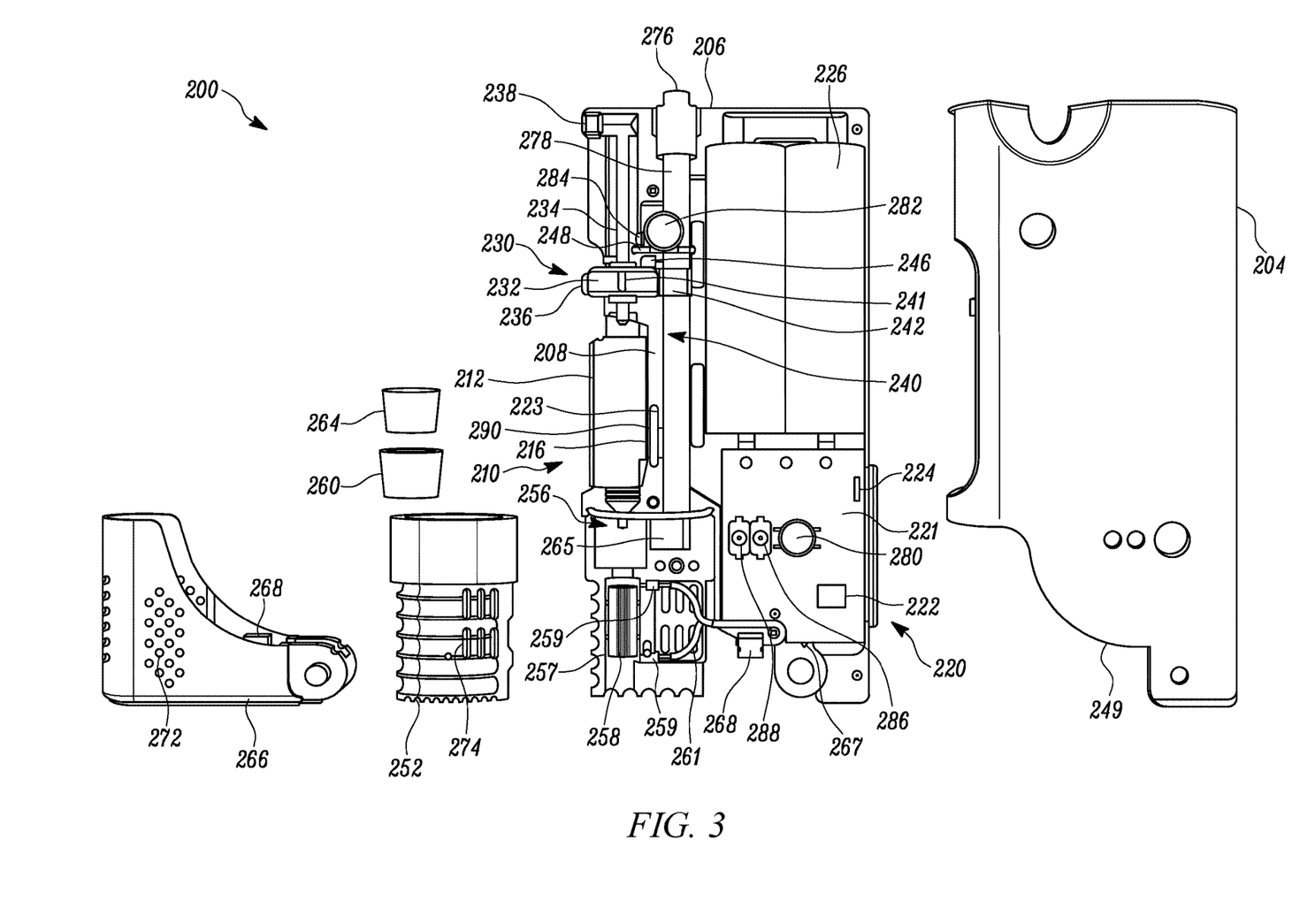
FIG. 3 is a partially disassembled view of the vaporizing device, in accordance with an embodiment of the present disclosure.
Figure 4:
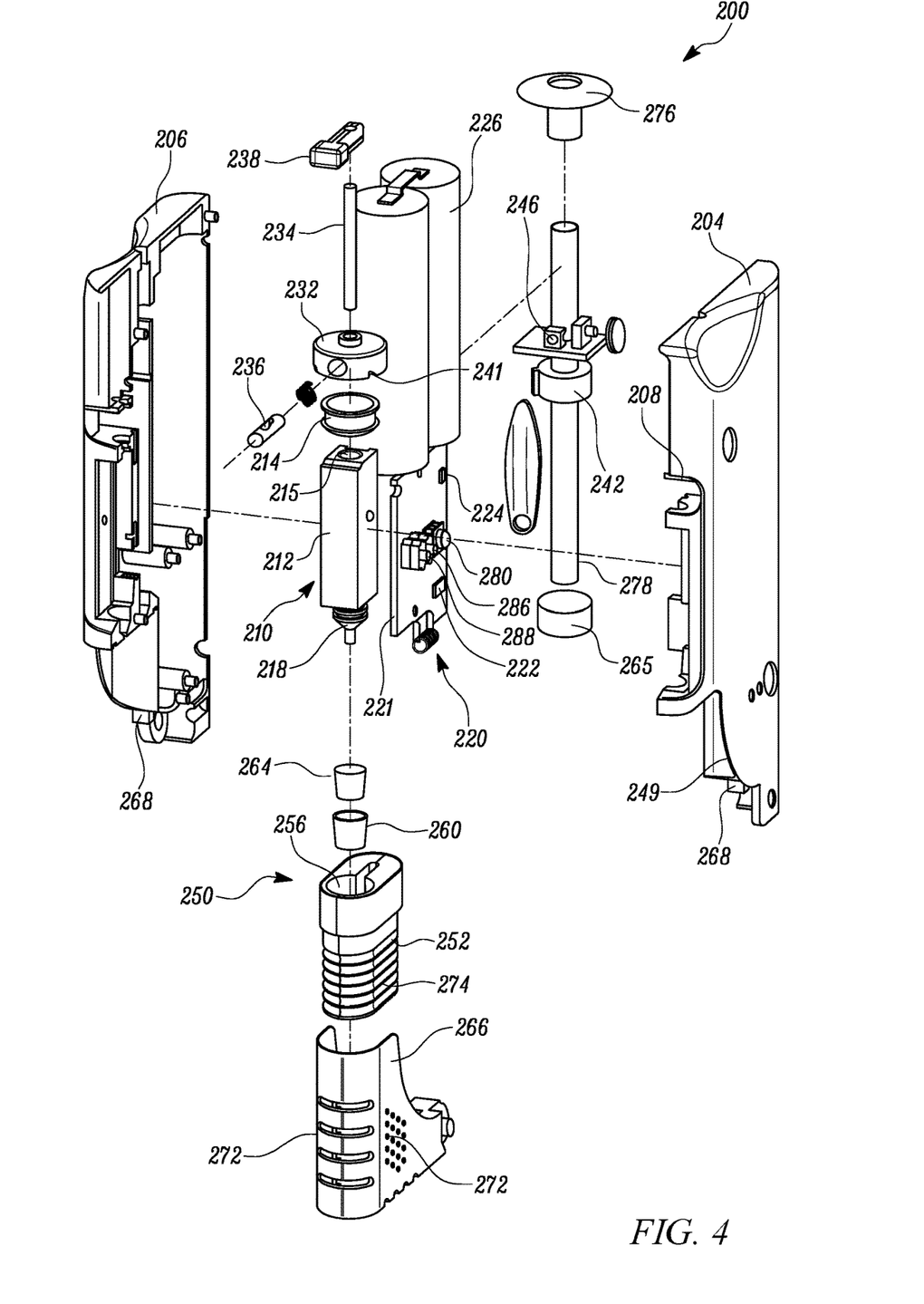
FIGS. 4 and 5 are exploded perspective views of the vaporizing device from different angles, in accordance with an embodiment of the present disclosure.
Figure 5:
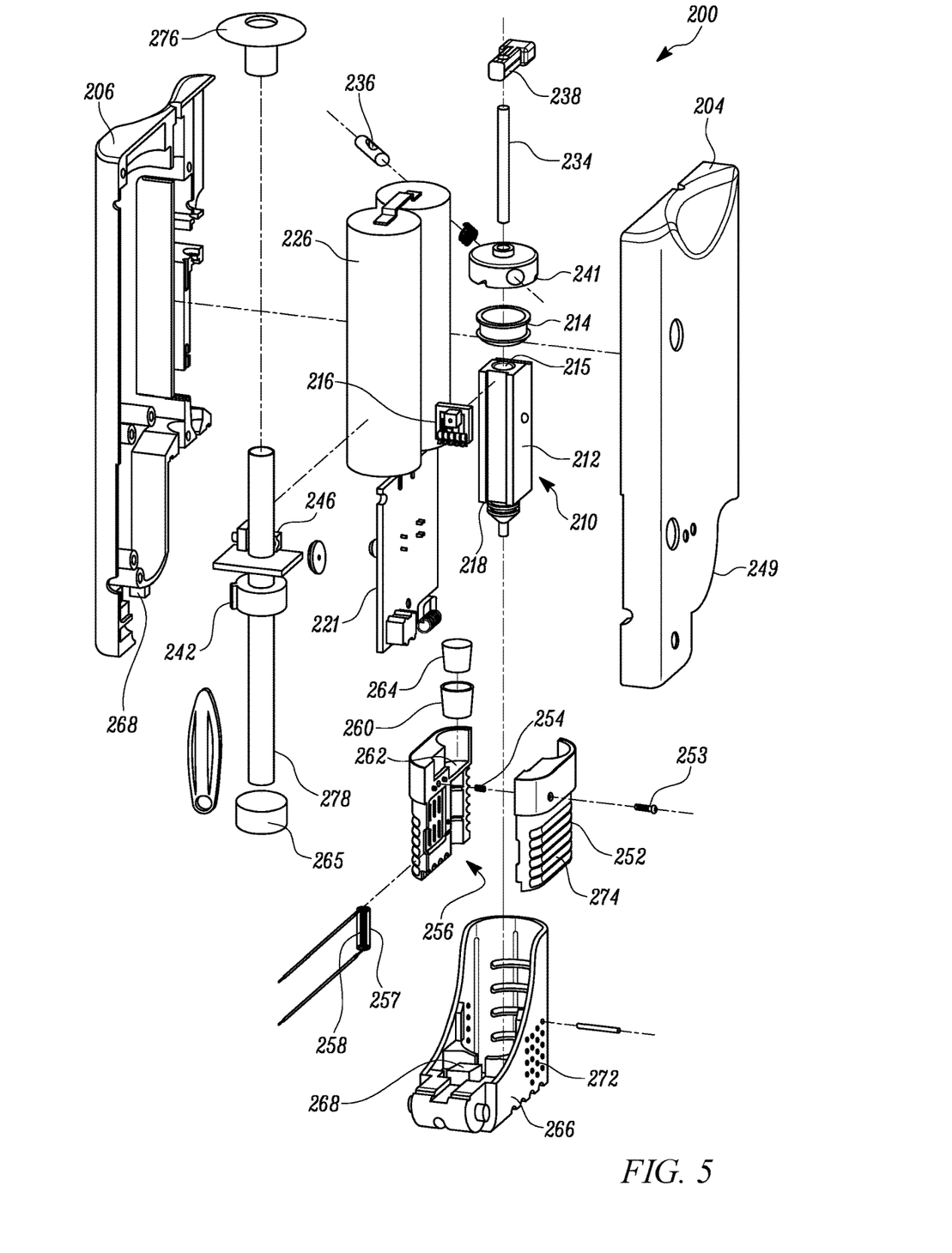

FIGS. 2-5 illustrate different views of the vaporizing device 200, according to an embodiment of the present disclosure. In particular, FIG. 2 illustrates an assembled view of the vaporizing device 200, and FIG. 3 illustrates a partially disassembled view of the vaporizing device 200 showing the internal components thereof and further demonstrates a manner in which each component may be coupled to an adjacent component to assemble the vaporizing device 200. Further, FIG. 4 and FIG. 5 illustrate exploded perspective views of the vaporizing device 200 from two different angles. In the exploded views of FIG. 4 and FIG. 5, some assemblies are shown exploded in one figure and other assemblies are shown exploded in other figure for the purpose of illustration. Referring to FIGS. 2-5 in combination, as illustrated, the vaporizing device 200 includes a housing 202 enclosing various assemblies and components thereof. The housing 202, generally, has a rectangular cross-section and extends in a longitudinal direction, imparting the housing 202 a cuboidal shape; however it may be contemplated that the housing 202 may have any other suitable shape, such as cylindrical, spherical, etc. The housing 202 may be shaped such that the vaporizing device 200 may be ergonomically handled by the user. The housing 202 may be manufactured from a metallic material with sufficient electric conductivity and chemical resistance. In an example, the housing 202 is made of an aluminum alloy. Further, as illustrated, the housing 202 may generally include two halves, a first half 204 and a second half 206. The two halves 204, 206 may provide multiple grooves and apertures therein, to receive and mount components of the vaporizing device 200 inside the housing 202. The two halves 204, 206 may be joined together by using fasteners, such as screws or the like. In particular, it may be seen from the associated drawings, the housing 202 may provide a groove 208 at a junction of the first half 204 and the second half 206.

The vaporizing device 200 utilizes a cartridge 210 to store a concentrate (not shown) to be vaporized. The cartridge 210, generally, includes a predefined quantity of the concentrate stored therein. The cartridge 210 may be in the form of a hollow vessel having an appropriate internal volume to be filled with the predefined quantity of the concentrate. In an example, the cartridge 210 is prefilled with 1000 mg of the concentrate. The term "concentrate," as used herein, may include substances in the form of chemicals, distillates, and isolates. Examples of the concentrate include vaporizable medications, such as tetrahydrocannabinol (THC), terpenes, terpinoids, cannabidiol (CBD), and other constituents of cannabinoids. Other examples of the concentrate include dry herbs, essential oils, waxes, and loose leaves. The cartridge 210 may generally be filled with a homogenous concentrate in liquid form, or a viscous liquid, such as waxes and oils, which may be extruded out of the cartridge 210 from a bottom opening (not shown) of the cartridge 210. The cartridge 210 may include a cartridge casing 212 and a cartridge plunger 214 slidably received within the cartridge casing 212. The cartridge plunger 214 may be disposed inside the cartridge casing 212 in a manner such that when pushed, the cartridge plunger 214 forces the concentrate towards the bottom opening of the cartridge 210 to be extruded out. As illustrated, the cartridge 210 may further have a top opening 215 to provide access for pushing the cartridge plunger 214, when positioned inside the cartridge casing 212.

In an embodiment, the cartridge 210 includes a memory module 216 to store an identification code associated with the concentrate. Those skilled in the art will appreciate that the identification code associated with the concentrate identifies the cartridges containing the concentrate. The memory module 216 may be mounted externally on the cartridge casing 212. In an example, the memory module 216 may be an electrically erasable programmable read-only memory (EEPROM), which allows for its contents to be erased and reprogrammed using a pulsed voltage. Those skilled in the art will further understand and appreciate that each EEPROM has its own unique ID which in turn permits unique identification of each cartridge 210 containing the concentrate associated with the identification code. Moreover, the unique ID may be component of the identification code so as to facilitate both identification of the constituent within the cartridge as well as the total number and location of the cartridges 210 containing the identified concentrate. In the present example, the identification code stored in the memory module 216 of the cartridge 210 is indicative of properties of the concentrate therein, such as type of concentrate, quantity of concentrate, expiry date of concentrate (if any), etc. In other words, the identification code associated with the cartridge 210 correlates with concentrate information. The identification code may be numeric or alpha-numeric in form. In an example, the identification code associated with the cartridge 210 may be in the form of a Radio Frequency Identification (RFID) tag. In alternate examples, the identification code may be in the form of a visual code, such as a bar code and a Quick Response (QR) code, pasted on a predefined location on the cartridge casing 212. It may be understood that the identification code is programmed into the memory module 216 based on the testing of the concentrate substance in a testing facility; and each identification code may be unique to a particular batch of concentrate. As the identification code is stored in the memory module 216 of the cartridge 210, simultaneously the same identification code along with the corresponding concentrate information is stored in a database of the central server 400, as will be described later in detail.

In the vaporizing device 200, the cartridge 210 is mounted in the housing 202 in a detachable manner. In particular, the cartridge 210 is received and secured in the groove 208 of the housing 202. The cartridge 210 may have any suitable shape including, but not limited to, rectangular, cylindrical, and the like. The cartridge 210, or in particular the cartridge casing 212, may generally be shaped to complement the groove 208 in the housing 202 so that the cartridge 210 may snap into place inside the groove 208. In some examples, the cartridge 210 may store a digital rights management (DRM) code, in the memory module 216, indicating whether the cartridge 210 is properly compatible to be installed in the present vaporizing device 200. As illustrated, the vaporizing device 200 may include an injector 218 coupled to the cartridge 210 and mounted externally below the cartridge casing 212. The injector 218 may be secured in the groove 208 of the housing 202. Specifically, a tip (not shown) of the cartridge 210 is placed into the injector 218 and then snapped into place inside the groove 208 of the housing 202.

In an embodiment, the vaporizing device 200 includes a control unit 220 to execute various instructions related to the operations of the vaporizing device 200, and further to record the various operations of the vaporizing device 200 and generate corresponding data. The control unit 220 may include a circuit board 221 to which various electronic components of the vaporizing device 200 are either embedded onto or connected via wires. The control unit 220 may include a processor 222 for executing various instructions for controlling the operation of the vaporizing device 200. The processor 222 may be a single processing unit or a number of processing units working in conjunction. The control unit 220 may further include, but not limited to, an arithmetic logic unit (ALU), a digital signal processor, a microcomputer, a field programmable gate array (FPGA), a System-on-Chip (SoC), a programmable logic unit, or any other circuitries capable of responding to and executing instructions in a defined manner. The control unit 220 may also include a memory (not shown) to store instructions for executing the operations of the vaporizing device 200, and further temporarily store data generated from the operations of the vaporizing device 200.

In an embodiment, the control unit 220 may include a code circuitry 223 positioned proximal to the memory module 216 of the cartridge 210, when mounted in the housing 202. In the illustrated example, the code circuitry 223 is shown separate from the circuit board 221; however, in other examples, the code circuitry 223 may be embedded therewith. The code circuitry 223, of the control unit 220, reads the identification code from the cartridge 210. In an example, the code circuitry 223 may utilize communication standards like Near Field Communication (NFC) or the like, to read the identification code from the memory module 216 of the cartridge 210. In some examples, the code circuitry 223 may utilize laser beams or some other form of light source, to read the identification codes in the visual forms, such as bar codes, QR codes, etc. The control unit 220 may use the identification code read from the cartridge 210 for further processing, as will be explained later in detail.

In an embodiment, the vaporizing device 200 includes a communication unit 224 disposed within the housing 202. The communication unit 224 is coupled with the control unit 220 to receive and send information about the device operation settings, among others. The communication unit 224 configures the control unit 220 of the vaporizing device 200 to be in signal communication with the computing device 300 of the user. In particular, the communication unit 224 transmits the identification code read from the cartridge 210 mounted in the housing 202 of the vaporizing device 200, to the computing device 300. In an example, the communication unit 224 is a Bluetooth Low Energy (BTLE) module, utilizing a relatively low-power 2.4 gHz antenna (not shown) to provide a direct link for wireless communication between the vaporizing device 200 and the computing device 300.

The vaporizing device 200 also includes a power source 226 to provide electrical power to various components thereof. The power source 226 may be in the form a rechargeable battery or batteries disposed within the housing 202. The vaporizing device 200 may also include a charging port (not shown) provided on an outer periphery of the housing 202 and in electric connection with the power source 226 located therein. In such case, the user may employ an external power cord (not shown) to connect the charging port with an external power socket or the like. In an example, the charging port may use a micro-USB standard for the purpose of charging the power source 226; and in some examples, the same charging port may further be utilized for data transfer, such as for updating a source code in the memory of the control unit 220, e.g. to change some parameters associated with the operations of the vaporizing device 200. In alternate examples, the vaporizing device 200 may include a permanently fixed and retractable electrical cord in contact with the power source 226 at one end, and with another end having a plug which may be inserted in an electric socket for charging purposes.

The vaporizing device 200 further includes a dosing unit 230 located in the housing 202, generally, at a top of the cartridge 210. The dosing unit 230 may be operatively coupled with the cartridge 210 to extrude the concentrate therefrom. The dosing unit 230 includes a dispensing wheel 232 rotatably disposed within the housing 202. The dosing unit 230 further includes a dispensing plunger 234 threadably coupled to the dispensing wheel 232, in an aperture (not shown) thereof. In particular, the dispensing plunger 234 may have external threads which may be engaged with internal threads in the aperture of the dispensing wheel 232, such that the dispensing plunger 234 moves linearly based on a rotation of the dispensing wheel 232; for example, the dispensing plunger 234 moves linearly downward when the dispensing wheel 232 is rotated in a clockwise direction, and vice-versa. In the vaporizing device 200, a lower end of the dispensing plunger 234 extends into the cartridge 210 through the top opening 215. The dispensing plunger 234 with its downwards linear movement pushes the cartridge plunger 214 downwards, which in turn forces the concentrate to extrude out from inside of the cartridge 210. In the vaporizing device 200, the dosing unit 230 may be configured to directly correlate the rotational movement of the dispensing wheel 232 with the linear movement of the dispensing plunger 234; i.e., for a definite degree of rotation of the dispensing wheel 232, the dispensing plunger 234 moves a certain distance depending upon a pitch of the engaged threads among other factors. This way the dosing unit 230 enables the user to control the quantity of the extruded concentrate by controlling the rotation of the dispensing wheel 232.

In some examples, the dosing unit 230 may further include a release button 236 contained within the dispensing wheel 232 and configured to move between a pressed position and a depressed position. The release button 236 engages and disengages the dispensing plunger 234 with the dispensing wheel 232, based on the pressed and depressed position thereof, respectively. Specifically, in the depressed position, the release button 236 disengages from the dispensing plunger 234 to allow for the linear movement of the dispensing plunger 234 away from the cartridge 210. The dosing unit 230 may also include a reset knob 238 fixed to a top end of the dispensing plunger 234 so that the dispensing plunger 234 may be pulled upward out of the housing 202 by the user, e.g. for removal of the cartridge 210 from the housing 202, by setting the release button 236 in the depressed position.

The vaporizing device 200 further includes a dosage indication unit 240 for assisting the user of the vaporizing device 200 to estimate a number of dosages of concentrate extruded from the cartridge 210. In an example, the dispensing wheel 232 includes one or more slots 241 disposed at regular intervals of predefined degrees on a periphery thereof. Specifically, in an example, the dispensing wheel 232 includes four slots 241 disposed at 90° intervals. The dosage indication unit 240 includes a clicker 242 received in the housing 202 and biased against the dispensing wheel 232, such that the clicker 242 engages with one of the four slots 241 of the dispensing wheel 232 after every predefined degrees of rotation of the dispensing wheel 232. In an example, the clicker 242 may be made of a plastic material, and as the user rotates the dispensing wheel 232 clockwise by the predefined degrees, a "click" sound may be generated by the mechanical action of the clicker 242 snapping and engaging with one of the four slots 241. The "click" sound may be felt or heard by the user to ascertain that a fixed dosage of the concentrate proportional to the predefined degrees of rotation has been extruded from the cartridge 210. In one exemplary configuration, the vaporizing device 200 may be configured such that for every 90° of rotation of the dispensing wheel 232 in the clockwise direction, a 5 mg dose of concentrate is extruded from the cartridge 210; providing the user of the vaporizing device 200 having a 1000 mg cartridge with approximately 200 "clicks" or, in other words, 50 complete rotations of the dispensing wheel 232 of concentrate supply from the cartridge 210.

In some examples, the dosage indication unit 240 may further include a dosing switch 246 located in proximity to the clicker 242. The dosing switch 246 may be configured to detect the engagement of the clicker 242 with any of the slots 241 in the dispensing wheel 232. For this purpose, the dosing switch 246 may be any sensor capable of sensing the "click" sound, such as a microphone with its associated circuitry; however, other suitable types of sensors may alternatively be used without any limitations. The dosing switch 246 may generate a dosage signal indicative of one dose of concentrate having been extruded from the cartridge 210, based on the detection. The dosage indication unit 240 may further include a dosing circuitry 248 in signal communication with the dosing switch 246. The dosing switch 246 may transmit the generated dosage signal to the dosing circuitry 248. The dosing circuitry 248 may maintain a record of the number of dosages of concentrate extruded from the cartridge 210, based on the number of the dosage signals received. Circuits, like the dosing circuitry 248, for recoding the count of received signals are well known in the art and have not been explained herein in detail for the brevity of the disclosure.

In one or more examples, the dosing circuitry 248 may be disposed in communication with the control unit 220 of the vaporizing device 200, working in conjunction therewith. In some examples, the dosing circuitry 248 may form a part of the control unit 220 of the vaporizing device 200. The control unit 220 may receive the information about the number of dosages of concentrate extruded from the cartridge 210 from the dosing circuitry 248. The control unit 220 registers a single dosage of concentrate extruded from the cartridge 210 based on the generation of the dosage signal. The control unit 220 further records a number of dosages of concentrate extruded from the cartridge 210 and utilize the code circuitry 223 to write/program this information onto the memory module 216 of the cartridge 210, in order to track the quantity of concentrate remaining inside the cartridge 210. Accordingly, it may be possible to find out the quantity of concentrate remaining inside the cartridge 210 detached from the housing 202 of the vaporizing device 200, e.g. by the user or in a cartridge re-filling facility, using any suitable reader.

From FIGS. 2-5, it may be seen that the housing 202 may have a cut-out 249 in the form of an arc, at a bottom corner thereof. In an embodiment, the vaporizing device 200 may include an oven assembly 250 connected to the housing 202 and positioned in the cut-out 249. The oven assembly 250 may be connected with the housing 202 by using a suitable fastening arrangement, involving one or more of screws, pins, nuts and bolts, and the like. The oven assembly 250 includes an oven casing 252, shown assembled in FIG. 4 and disassembled in FIG. 5. As better illustrated in FIG. 5, the oven casing 252 may be assembled using an arrangement of a screw 253 and a threaded insert 254. The oven assembly 250 includes a vaporization chamber 256 defined in the form of a hollow cylindrical structure in the oven casing 252. The oven assembly 250 may further include a heating element 258 disposed inside in the oven casing 252.

As illustrated, the vaporization chamber 256 may be located directly below the injector 218, and disposed in fluid communication with the cartridge 210 via the injector 218. The vaporization chamber 256 may be positioned so as to collect the concentrate extruded from the cartridge 210. Further, the heating element 258 may be positioned below the vaporization chamber 256, and disposed in thermal communication therewith. The heating element 258 may be configured to generate heat energy to vaporize the concentrate in the vaporization chamber 256. In an example, the heating element 258 may be in the form of a coil enclosed in a ceramic sheath 257 and having two legs connected to the power source 226 via contacts 259 and a wire 261 running inside the housing 202. In one example, the wire 261 may be a conductive silicone wire. Using these electrical connections, the heating element 258 receives electrical energy from the power source 226, which in turn is converted into heat energy. In one or more examples, the heating element 258 may be connected to the power source 226 via the control unit 220, such that the electrical energy supplied to the heating element 258 from the power source 226 is controlled by the control unit 220; which in turn enables the control unit 220 to regulate the heat energy generated by the heating element 258 as per a temperature setting of the vaporizing device 200. In an example, the oven casing 252 may be made of a ceramic material, such as, but not limited to, alumina. Such ceramic material for the oven casing 252 may trap the heat generated by the heating element 258 for efficient vaporizing of the concentrate in the vaporization chamber 256, and further provide thermal insulation for outside of the oven casing 252.

In the present embodiment, the oven assembly 250 may include a basket 260 removably placed inside the vaporization chamber 256 at a bottom surface 262 thereof. The basket 260 may be manufactured from thin sheet of perforated metal which is stamped to conform to the shape of the inside of the vaporization chamber. In an example, the basket 260 may include a plurality of orifices (not shown) at its bottom surface to dispose the vaporization chamber 256 in fluid communication with a region of the oven assembly 250 having the heating element 258. Further, the oven assembly 250 may include a porous insert 264 located in the vaporization chamber 256, and removably placed inside the basket 260, so that the porous insert 264 may be removed from the vaporization chamber 256 as desired by the user. In an example, the porous insert 264 may be made of a metal alloy material like "304 stainless steel," also commonly known as "metal foam." The porous insert 264 contains the concentrate collected within the vaporization chamber 256 with its absorbing characteristics. The porous insert 264 may further be structured to allow air to pass therethrough. In an example, the vaporizing device 200 provides a double-filtration system. For this purpose, the oven assembly 250 may include a filter 265 located downstream of the vaporization chamber 256. Generally, the filter 265 may be made of the same material as the porous insert 264. It may be understood that the vaporized concentrate from the vaporization chamber 256 is passed through the filter 265 before being supplied for inhalation by the user to remove any toxic substances from the smoke and thereby providing the user with relatively cleaner vaporized concentrate for inhalation.

In an embodiment, as illustrated, the oven assembly 250 may further include an oven cover 266 connected to the housing 202 using magnets (generally shown as magnets 268). In an example, the oven cover 266 may include a first set of magnets, and the housing 202 may include a second set of magnets with one magnet each for the two halves 204, 206; such that the first set of magnets and the second set of magnets attract each other to lock the over cover 266 with the housing 202 and further the first set of magnets and the second set of magnets may be separated by some external pulling force, for example as provided by the user. This way the oven cover 266 is configured to move between a closed position and an open position. In the closed position, the oven cover 266 may at least partially enclose the oven assembly 250, including the vaporization chamber 256 and the heating element 258, therein. In the open position, the oven cover 266 may be disposed at an angle of approximately 45° with respect to the housing 202, and allow for access to the vaporization chamber 256 in the oven assembly 250. The oven assembly 250 may also include an interlock switch 267 disposed in communication with the control unit 220. The interlock switch 267 generates a safety signal if the oven cover 266 is displaced from the closed position. Further, the control unit 220 receives the safety signal and may shut-off the heating element 258 based on the safety signal. In an alternate example, the oven cover 266 may be connected to the housing 202 by means of a latch and a compression spring (not shown). The latch and the compression spring arrangement not only provides the hinged connection between the oven cover 266 and the housing 202, but also allows the oven cover 266 to stay in the open position, e.g. when the user may have pulled the oven cover 266 to be in the open position for accessing the vaporization chamber 256.

Also, as illustrated, the oven cover 266 may include a plurality of vents 272 at its sides and bottom (not shown). Further, in the oven assembly 250, the oven casing 252 may include a plurality of vents 274 therein. The vents 272, 274 may allow entry of fresh air from the atmosphere into the oven assembly 250 to be circulated in a defined path inside the vaporizing device 200. The air received in the oven assembly 250 is exposed to the heating element 258, which in turn heats the received air. In one example, the heating element 258 heats the air. Particularly, the air may be superheated. This superheated air is received in the vaporization chamber 256 through the orifices in the basket 260. The heated air, in the vaporization chamber 256, passes through the porous insert 264, thereby vaporizing the concentrate absorbed in the porous insert 264 by the convection effect. In an alternate example, the heating element 258 may directly provide heat to the concentrate in the vaporization chamber 256 by conduction effect in order to vaporize the concentrate.

The vaporizing device 200 may include a mouthpiece 276 to administer the vaporized concentrate to the user. The mouthpiece 276 may, typically, be made of any medical grade material, such as silicone, soft rubber, and plastic. In an example, the mouthpiece 276 may be detachably mounted to the housing 202 of the vaporizing device 200. The mouthpiece 276 may, generally, be located at a top end of the housing 202. The vaporizing device 200 may further include a conduit 278 fluidly communicating the mouthpiece 276 with the vaporization chamber 256. As may be understood, the conduit 278 provides a path inside the vaporizing device 200 for the flow of air from the vaporization chamber 256 to the mouthpiece 276. Therefore, as the user pulls for the vapors through the mouthpiece 276, the fresh air is drawn into the oven assembly 250 via the vents 272, 274, which carry the vaporized concentrate from the vaporization chamber 256 to the mouthpiece 276 via the conduit 278 for consumption by the user. It may be contemplated that such configuration of vents 272, 274 in relation to the conduit 278 allows for a cross-flow through the oven assembly 250 to facilitate drawing of the air from outside of the vaporizing device 200. The conduit 278 may further help to substantially isolate the path for flow of the vaporized concentrate from the electronic components of the vaporizing device 200 in order to avoid possibility of any short-circuits.

In the illustrated configuration, the vaporizing device 200 further allows for manual loading of the concentrate directly into the vaporization chamber 256. For this purpose, the user may put the oven cover 266 in the open position such that the vaporization chamber 256 is accessible. In case of a liquid concentrate, the user may directly pour or inject the concentrate onto the porous insert 264 to be absorbed thereby. In case of a non-liquid concentrate, such as wax, powder, dry *cannabis*, etc., the user may first remove the porous insert 264 from the vaporization chamber 256, and then place the concentrate directly into the basket 260. Other non-liquid concentrates, like shatter which is usually in powder form, may be loaded directly onto the porous insert 264 by first removing the basket 260 from the vaporization chamber 256. In some other cases, the user may obtain a basket 260 prefilled with pods of dry-herb or the like, and directly place such basket 260 inside the vaporization chamber 256 without the porous insert 264; thus providing convenient usage of non-liquid concentrate. In any case, the heated air from the heating element 258 vaporizes the concentrate for consumption purposes. In other examples, the cartridge 210 may be designed to store and extrude the non-liquid concentrate into the vaporization chamber 256.

It may be contemplated that the vaporizing device 200 may accrue vapor residue on specific internal components, especially the conduit 278, as a result of repetitive use, even when used properly. In order to clean the conduit 278, the user may; first remove the mouthpiece 276, and then pull the oven cover 266 to overcome the attractive force of the magnets 268 such that the oven cover 266 is moved to its open position. At this point, the user may dip a pipe cleaner (not shown) in a cleaning solution. It may be contemplated that the pipe cleaner may be a Q-tip or the like. The user may use this pipe cleaner with the cleaning solution and slide the pipe cleaner down through the top of the conduit 278 until it comes out the bottom thereof. The user may repeat the above steps until the conduit 278 is completely clean. Further, to clean the vaporization chamber 256, the user may; first remove any loose particulate or residual substance present therein, and then remove the porous insert 264 and the basket 260 from the bottom of the vaporization chamber 256. The user may then use a Q-tip dipped in the cleaning solution and gently wipe off the residue accrued in the vaporization chamber 256. It may be contemplated that the use of basket 260 reduces the need of frequent cleaning of the vaporization chamber 256, as the residues from the concentrate and excess accumulation from the vaporization builds on the basket 260 rather than the walls of the vaporization chamber 256, and further allows easier cleaning as the basket 260 may be removed from the vaporization chamber 256 for its cleaning by moving the oven cover 266 in the open position. In order to clean the porous insert 264, the user may; first make sure to remove the basket 260 including the porous insert 264 from the vaporization chamber 256, then soak the porous insert 264 in the cleaning solution for about 15 minutes and then rinse thoroughly with water, then let the porous insert 264 to dry, and reinstall the porous insert 264 back in the vaporization chamber 256. Similarly, to clean the mouthpiece 276, the user may; first make sure to remove the mouthpiece 276 from the housing 202 by gently pulling it off of the top of the conduit 278, then soak the mouthpiece 276 in the cleaning solution for about 15 minutes and then rinse thoroughly with water, then let the mouthpiece 276 to dry, and reinstall the mouthpiece 276 back in the vaporizing device 200.

In some embodiments, the vaporizing device 200 may include one or more buttons to control one or more user-controlled operations thereof. The vaporizing device 200 may further include one or more indication lights for communicating information about the various operations and current settings/parameters of the vaporizing device 200. In an example, the indication lights may be RGB based LEDs. In the illustrated example, the vaporizing device 200 is shown to include two buttons; a power button 280 and a fire button 282; and further four indication lights namely, a first indication light 284, a second indication light 286, a third indication light 288 and a fourth indication light 290. In the vaporizing device 200, each of the buttons 280, 282 may generate specific signals on pressing and are disposed in signal communication with the control unit 220; such that the control unit 220, acting as the intermediator, may generate specific instructions in response to such signals for signaling the corresponding components to perform certain functions. Further, the control unit 220 may control the flashing of the indication lights 284, 286, 288, 290 to convey specific information to the user, as programmed. As illustrated some of the buttons and the indication lights, specifically the power button 280, and the second indication light 286 and the third indication light 288 are directly embedded on the circuit board 221 of the control unit 220.

In one exemplary configuration, the user may hold the power button 280 for 2 seconds, to turn the vaporizing device 200 ON/OFF. In an example, the communication unit 224 of the vaporizing device 200 starts pairing with the computing device 300 as soon as the vaporizing device 200 is turned ON. Further, the second indication light 286 may flash while pairing between the communication unit 224 and the computing device 300 takes place, and then show solid BLUE color when the pairing process is completed. The power button 280 may further be used for checking various current settings of the vaporizing device 200. For example, clicking the power button 280 once may show the charge level of the power source 226 using the second indication light 286; two clicks may operate the third indication light 288 to indicate temperature setting, and three clicks may restart the communication unit 224 to re-establish a connection with the computing device 300 and may further flash all the lights 284, 286, 288, 290 once. The fire button 282 may be used for operating the heating element 258, in the vaporizing device 200. The user may press the fire button 282 and hold it down to heat up the heating element 258 to the defined temperature setting and continue to hold it down while inhaling the concentrate to keep the vaporizing device 200 at the defined temperature setting.

Further, in one exemplary configuration, the first indication light 284 may be indicative of the power state of the vaporizing device 200, i.e. the first indication light 284 being ON represents that the vaporizing device 200 is ON and vice-versa. Similarly, the second indication light 286 may be indicative of the current charge level of the power source 226 of the vaporizing device 200; such as GREEN color indicates power level greater than 50%, YELLOW color indicates power level equal to or less than 50%, RED color indicates power level equal to or less than 15%, and flashing RED color indicates power level less than 5% and that the vaporizing device 200 needs immediate charging for continuous operation. The third indication light 288 may be indicative of the temperature setting of the vaporizing device 200, such that GREEN color may represent high temperature setting, BLUE color may represent medium temperature setting and PURPLE color may represent low temperature setting, of the vaporizing device 200. The fourth indication light 290 indicates various states of the vaporizing device 200 using different color schemes; such as heating up, reached defined temperature setting, level of the concentrate in the cartridge 210, warning if the user is pulling too hard, etc. It may be contemplated that control schemes for the buttons 280, 282 and color schemes for the indication lights 284, 286, 288, 290 as described herein are not limiting to the disclosure.

In an embodiment, the vaporizing device 200 includes a proximity detection system (not shown) having some sub-components distributed in the housing 202. The proximity detection system detects the presence of a human being up to a distance range in proximity to the vaporizing device 200. In one exemplary configuration, the proximity detection system may be able to detect the human being positioned up to a distance of 48 inches from the vaporizing device 200. For this purpose, the proximity detection system makes the housing 202, i.e. both the first half 204 and the second half 206, a ground reference capacitor by passing an electrical pulse therefrom using a low voltage/low impedance current source. It may be contemplated that to achieve this effect, the housing 202 is made of metallic substrate like aluminum, as mentioned earlier. Now, the charge build-up in the housing 202 is drained by using a resistor of known value conductively connected to the housing 202. The gradual decay in charge voltage is then measured with a high impedance analog to digital converter where the discharge curve is used to calculate capacitance via RC time constant. Once a baseline capacitance is established it is inferred that any deviation measured will be due to changes in the environment's dielectric constant and it may therefore be inferred that a large bag of salty water is placed in the vicinity of the vaporizing device 200, such as a human being. In one or more examples, the proximity detection system may be integrated with the control unit 220 in the vaporizing device 200.

In some examples, the control unit 220, in the vaporizing device 200, may be configured to store prescribed timings when the user is allowed to have dosage(s) of the concentrate by vaping. Each time the proximity detection system detects the presence of a human being, the control unit 220 assumes that the detected human being is the user of the vaporizing device 200. In a situation, when the user is within the distance range as detected by the proximity detection system, but present time of detection is not within the prescribed timings; the control unit 220 may generate a dosage reminder to warn the user that it may not be the prescribed time for having the dosage. In an example, the dosage reminder may include, but not limited to, flashing of all the lights 284, 286, 288, 290, in some predefined color, providing an effective and non-intrusive communication method with the user.

Further, in an embodiment, the vaporizing device 200 includes an anemometer to measure flow rate of a volume of air passing therethrough. In an implementation, the heating element 258, as already present in the vaporizing device 200, is used as the anemometer for airflow measurement purposes; and as such the terms "anemometer" and "heating element" have been interchangeably used for the description. The anemometer may, generally, be placed somewhere inside the conduit 278 in direct exposure to the airflow therein. In an example, the anemometer works on the principle of a hot wire anemometer. In the present implementation of the anemometer in the vaporizing device 200, current and voltage measurements are taken directly from the heating element 258, while operating. Further, some other parameters of the heating element 258 including operating temperature, material composition, and dimensionality are determined. These measurements are first used to compute the resistance of the heating element 258 prior to any flow to establish a calibration offset or "baseline." As air begins to flow across the heating element 258, some of the heat is imparted into the air and thus cools the heating element 258 slightly. As a material's resistance is proportional to its temperature, this change in temperature leads to a measurable deviation from the baseline resistance. And as the law of Joule Heating provides that the rate of cooling is proportional to the volume of air being heated, it may be extrapolated that this deviation may be proportional the rate of flow. Therefore, it is possible to determine flow rate of the volume of air flowing through the vaporizing device 200 simply by algorithmically correlating current and voltage to resistance deviations as the heating element 258 operates. The air flow, as calculated, may be used to estimate the quantity of the concentrate consumed by the user in comparison to the quantity of the concentrate extruded from the cartridge 210, in the vaporizing device 200.

Furthermore, in an embodiment, the vaporizing device 200 includes a particle detection system (not shown) to detect suspended vaporized concentrate present within the conduit 278. The particle detection system and its subcomponents may, generally, be placed inside the conduit 278. The particle detection system operates in a manner similar to that of a Faraday Cup Electrometer and a Faraday Flow Meter to detect aerosolized vapor particles suspended within a volume of air. In the present implementation, the heating element 258 is utilized as aerosolizer and as an ionization and induction source. The heating element 258, connected to the power source 226, receives high voltage transients and magnetic field that propagate from the heating element 258 as it vaporizes the concentrate and applies a dipole moment to the vapors in-situ. These charged vapors are then drawn downstream through a conductive channel, electrically isolated from the heating element 258, into the conduit 278. As the charged vapors passes through the conduit 278, it contributes some of its charge to the walls of the conduit 278. A differential electrical potential is then measured at this point and is referenced to a point just upstream of the heating element 258. This potential is then filtered, amplified, and passed to an analog to digital converter to obtain a meaningful signal with amplitude proportional to the charge in the conduit 278 and therefore also to the density of the vapors within the given volume of air in the conduit 278. Thus, the particle detection system tracks whether or not there is any vapor present in the conduit 278, which may be communicated to the user by means of flashing of the first indication light 284 in, say WHITE color. The user may then choose to fully consume the vaporized concentrate minimizing wastage. The measurement corresponding to the estimated volume of the concentrate vapors present in the conduit 278 may also be stored in the control unit 220 for further processing, such as an exact quantity of the concentrate consumed by the user in a given vaping session.

Continuing with the description of FIG. 1, in an example, the computing device 300 may be a laptop, a smartphone, a mobile phone, a personal digital assistant (PDA), a tablet, a desktop computer, and the like. The computing device 300 is communicatively coupled with the central server 400 through a communication network 102. The communication network 102 may be a wireless network, a wired network, or a combination thereof. The communication network 102 may also be an individual network or a collection of many such individual networks interconnected with each other and functioning as a single large network, e.g., the internet or an intranet. The communication network 102 may be implemented as one of the different types of networks, such as intranet, local area network (LAN), wide area network (WAN), the internet, and the like.

In an example, the central server 400 may be a server, a desktop computer, a notebook, a portable computer, a workstation, a mainframe computer, and a laptop. In an implementation, the central server 400 may be a distributed or a centralized network system in which different computing devices may host one or more of the hardware or software components of the central server 400. Further, in an example, the central server 400 may be configured as an open Application Programming Interface (API) to facilitate communication with other computer systems, such as a hospital electronic health records (EHR) system. The central server 400 includes a database 402 and user profile data 404. The database 402 includes a plurality of identification codes and corresponding concentrate information. As described earlier, each identification code from the plurality of identification codes corresponds to a concentrate and is thus, linked with concentrate information corresponding to the concentrate and the identification of the cartridges containing the concentrate. In an example, a vendor implementing the central server 400 maintains the database 402. For instance, the vendor may use a computing device, such as the computing device 300, for generating an identification code for a concentrate. Subsequently, the vendor may use the computing device to upload the identification code and concentrate information corresponding to the concentrate to the central server 400. Further, as described earlier, for each cartridge 210 filled with the concentrate, the identification code corresponding to the concentrate is stored on the memory module 216 of the cartridge 210. As explained in the following description, assigning the identification code to the cartridge 210 facilitates in monitoring and managing concentrate usage of the user.

In an example, a user may use the vaporizing device 200 for performing one or more vaping sessions. Prior to using the vaporizing device 200 for a vaping session, the user may initially register himself/herself with the vendor of the vaporizing device 200. For registration, the user may install an application associated with the vaporizing device 200 on the computing device 300. The application provides the user with a graphical user interface for accessing services and operations associated with the vaporizing device 200. For instance, the user may use the application for operating or altering one or more functions of the vaporizing device 200. In another example, the user may use the application for obtaining information about the concentrate stored in the cartridge 210. Once the application is installed, the computing device 300 is configured to record user information associated with the user. The user information may include, without limitation, a name, an age, a height, a weight, a sex, and a medical history of the user.

In an example, the computing device 300 transmits the user information to the central server 400 for registering the user. As may be understood, the user information may be transmitted over a communication link implementing predetermined security protocols and standards for ensuring safety of the user information. On receiving the user information, the central server 400 may be configured to generate a user profile for the user based on the user information. As may be understood, once the user profile is generated, the user may not be required to register for subsequent vaping sessions. In an example, the user profile may be updated to include additional information besides the user information. The additional information may include session logs associated with vaping sessions of the user, information about one or more concentrates used by the user, information about efficacy of the concentrates with respect to user's reason for using a concentrate in a vaping session, and one or more recommendation for the user. In an example, the additional information is included in the user profile based on session data related to the current vaping session and the subsequent vaping sessions, as will be explained in the following description. In an example, the central server 400 stores the user profile in the user profile data 404. In an example, the user profile data 404 may be stored in a single database (not shown). In another example, the user profile data 404 may be stored in distributed or unlinked databases (not shown) communicatively coupled to the central server 400. In aforementioned examples, the single database or the distributed databases store(s) the user information in compliance with predefined security protocols, such as the Health Insurance Portability and Accountability Act (HIPAA).

As mentioned above, in an example, the user may learn about the concentrate being used in the cartridge 210. In such cases, the control unit 220 is configured to read the identification code stored in the memory module 216. On reading the identification code, the control unit 220 may trigger the communication unit 224 to transmit the identification code to the computing device 300. The communication unit 224 transmits the identification code to the computing device 300 through the antenna therein. In an embodiment, the computing device 300 may obtain the identification code from the user, in case of manual loading of the concentrate. For instance, the user may provide the identification code corresponding to the concentrate through a user input. In another example, the user may scan the identification code using the computing device 300. For instance, if the identification code is a bar code, the user may switch on a camera (not shown in the figure) of the computing device 300 for capturing the bar code.

In an example, the computing device 300 is configured to transmit the identification code to the central server 400 for obtaining the concentrate information corresponding to the concentrate. On receiving the identification code, the central server 400 is configured to retrieve the concentrate information corresponding to the identification code from the database 402. The retrieved concentrate information is then transmitted by the central server 400 to the computing device 300 for displaying the concentrate information to the user. In an alternate example, the communication unit 224, in the vaporizing device 200, may be capable of directly transmitting the identification code to the central server 400, e.g., using a Wi-Fi module, a cellular module or the like. Further, the vaporizing device 200 include a screen (not shown), like an e-ink display, to display the concentrate information directly on to the vaporizing device 200.

The computing device 300, in an example, may receive and store the concentrate information in an internal storage (not shown) of the computing device 300. In an example, on receiving a user input for displaying the concentrate information, the computing device 300 is configured to display the concentrate information to the user through a display screen (not shown) of the computing device 300. In an example the displayed concentrate information may include, a name of the concentrate, a quantity of concentrate left in the cartridge 210, and a chemical composition of the concentrate. Displaying of the concentrate information to the user enhances the user awareness with respect to the concentrate the user is using for vaping sessions. For instance, the user is made aware of the chemical composition of the concentrate. Accordingly, the user may choose to continue using the concentrate or may prefer to change the concentrate based on the chemical composition.

In an example, when a user of the vaporizing device 200 seeks to perform a vaping session, the user may provide at least one user input to the computing device 300. For instance, the user may provide a user input for selecting a reason for performing the vaping session. In such a case, the computing device 300 is configured to display to the user a list of reasons for performing the vaping session. The user may then select the reason from the list of reasons. In another example, the user may provide a user input defining the reason for performing the vaping session. Further, the computing device 300 records the reason and may update the list of reasons to include the reason defined by the user. Additionally, the user may provide a user input for determining a quantity of the concentrate to be administered during the vaping session. In addition to determining the quantity of the concentrate to be administered, the user may operate the vaporizing device 200 for extruding the determined quantity into the vaporization chamber 256. Further, the user may provide a user input for configuring a temperature setting of the vaporizing device 200. Thereafter, the user may provide a user input for triggering the vaping session. On receiving the user input, the computing device 300 is configured to transmit at least one instruction to the vaporizing device 200 for triggering the vaping session.

On receiving the at least one instruction, the vaporizing device 200 may configure the heating element 258 to the configured temperature for vaporizing the concentrate at that temperature. In an example, the concentrate information may also include a predetermined temperature setting depending on the type of the concentrate. Further, the control unit 220 may be configured to control the heating element 258 based on the temperature setting in the concentrate information. It may be understood that the user may choose to override the predetermined temperature setting to a desired temperature setting for a particular vaping session, by providing a user input via the computing device 300. The control unit 220 may control the heat energy generated by the heating element 258 based on instructions as per the user input. Once the concentrate is vaporized, the user may receive a notification indicating that the vaporizing device 200 is ready for use. In an example, the notification is displayed through the first indication light 284 on the vaporizing device 200. In another example, the notification is provided through a message on the computing device 300. In yet another example, the notification is provided through both, the first indication light 284 and the message.

In an example, when the vaping session concludes, i.e., the user is no longer using the vaporizing device 200 for vaping for a predetermined time, the computing device 300 is configured to generate session data corresponding to the vaping session. In an example, the session data may include a reason for performing the vaping session, the quantity of concentrate administered to the user, and the temperature setting at which the vaping session was performed. The computing device 300 subsequently, transmits the session data to the central server 400. In an example, the central server 400 receives the session data from the computing device 300. On receiving the session data, the central server 400 is configured to update the user profile of the user.

In an implementation, the computing device 300 is configured to generate a user survey form related to the vaping session of the user. The user survey form, in an example, may include one or more questions related to the vaping session. For instance, the user survey form may include questions related to efficacy of the concentrate, temperature setting of the vaporizing device 200, and other such questions. The computing device 300 may then display the user survey form to the user. In another implementation, the central server 400 may be configured to generate the user survey form on receiving the session data and may transmit the user survey form to the computing device 300 for displaying to the user. In an example, the user survey form is displayed to the user after a predetermined time interval, for instance, thirty minutes after the vaping session.

Subsequently, the computing device 300 is configured to receive a user feedback from the user based on the user survey form. In an example, the user survey form may include one or more answers to the questions included in the user survey form. Once the user feedback is received, the computing device 300 transmits the user feedback to the central server 400. The central server 400, in an example, may store the user feedback in the user profile data 404 and may associate the user feedback with the user profile of the user. In an example, the central server 400 may update the user profile based on the user feedback. For instance, the central server 400 may update the additional information based on the user feedback.

In an embodiment, the central server 400 is configured to generate recommendations for the user. For this purpose, the central server 400 identifies a plurality of users based on one or more user parameters associated with the user. The user parameters may include, without limitation, age, height and weight of the user. On identifying the plurality of users, the central server 400 is configured to retrieve user feedback associated with the plurality of users. Once the user feedback is retrieved, the central server 400 is configured to analyze the user feedback to generate a suggestion for the user. For instance, the central server 400 may identify other concentrates used by the plurality of users for a vaping session similar to the vaping session of the user. Amongst the identified other concentrates, the central server 400 may identify a concentrate in demand with other users based on the user feedback. The central server 400 may then generate the suggestion related to the concentrate. Once the central server 400 generates the recommendation, the central server 400 transmits the suggestion to the computing device 300. The computing device 300 may then display the suggestion to the user. In an example, the central server 400 may further transmit the generated suggestion to a computing device of a registered physician of the user.

Figure 6:
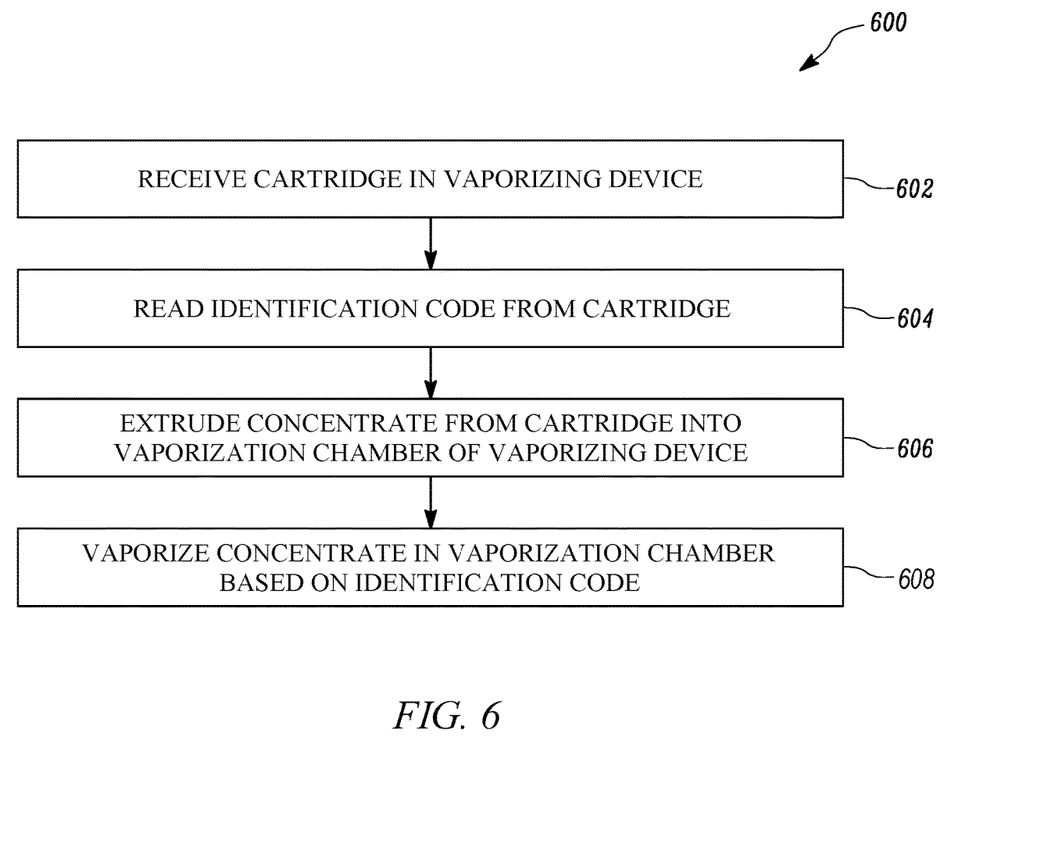
FIG. 6 illustrates a method for administering a concentrate to the user using the vaporizing device, in accordance with an embodiment of the present disclosure.

FIG. 6 illustrates a method 600 for administering the concentrate to the user using the vaporizing device 200. The vaporizing device 200 may be configured to monitor and control various aspects of the concentrate usage of the user. The order in which the method 600 is described is not intended as a limitation, and any number of the described method blocks may be combined in any order to implement the method, or an alternative method. Additionally, individual blocks may be deleted from the method without departing from the spirit and scope of the present disclosure.

At step 602, the method 600 includes receiving the cartridge 210 in the vaporizing device 200. The cartridge 210 may be snapped into the groove 208 of the housing 202, in the vaporizing device 200.

At step 604, the method 600 includes reading the identification code from the cartridge 210. The identification code may be read by the control unit 220 in the vaporizing device 200. In an example, the identification code may be read from the memory module 216 of the cartridge 210, using the code circuitry 222. In other examples, when the identification code is in the form of a visual code, it may be read by using lasers or other suitable light forms. The read identification code is transmitted to the computing device 300 via the communication unit 224. The computing device 300 further transmits the received identification code to the central server 400. In the system 100, the central server 400 may then provide the concentrate information corresponding to the identification code back to the computing device 300. In some examples, the central server 400, in addition to the concentrate information, may also provide information about the vaping session, including temperature settings, dosage quantity, dosage time, etc. for vaporizing the concentrate in the cartridge 210, to the computing device 300. It may be contemplated that the parameters like dosage quantity, dosage time, among other things, may be based on the user profile data 404 stored in the central server 400.

At step 606, the method 600 includes extruding the concentrate from the cartridge 210 into the vaporization chamber 256 of the vaporizing device 200. The concentrate is extruded from the cartridge 210 by using the dosing unit 230 in the vaporizing device 200. Further, the concentrate is properly passed to the vaporization chamber 256 by means of the injector 218.

At step 608, the method 600 includes vaporizing the concentrate in the vaporization chamber 256 based on the identification code. In particular, as discussed, the computing device 300 receives the concentrate information from the central server 400 based on the identification code. In some cases, the computing device 300 may additionally receive information about the vaping session, including temperature settings, dosage quantity, dosage time, etc. from the central server 400. Then, the computing device 300 may generate instructions based on the received information, and transmits these instructions to the control unit 220 of the vaporizing device 200, via the communication unit 224. Thereafter, the control unit 220 may operate the heating element 258 to control the heat energy generated by the heating element 258 to vaporize the concentrate in the vaporization chamber 256, as per the temperature setting among other factors.

Figure 7:
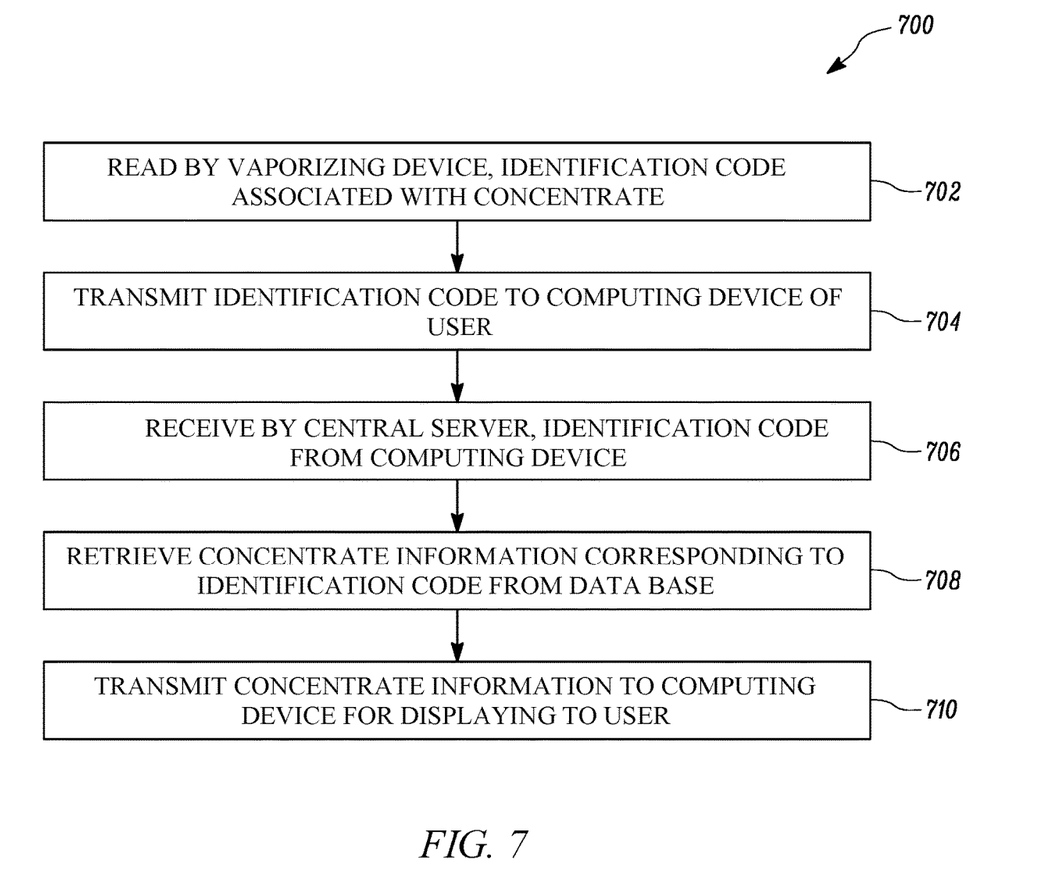
FIG. 7 illustrates a method for managing concentrate usage of the user, in accordance with an embodiment of the present disclosure.

FIG. 7 illustrates a method 700 for managing concentrate usage of a user, in accordance with an embodiment of the present subject matter. The method 700 may be described in the general context message of computer executable instructions. Generally, the computer executable instructions can include routines, programs, objects, components, data structures, procedures, modules, functions, etc., that perform particular functions or implement particular abstract data types. The method 700 may also be practiced in a distributed computing environment where functions are performed by remote processing devices that are linked through a communications network. In a distributed computing environment, computer executable instructions may be located in both local and remote computer storage media, including memory storage devices.

The order in which the method 700 is described is not intended as a limitation, and any number of the described method blocks can be combined in any order to implement the method, or an alternative method. Additionally, individual blocks may be deleted from the method without departing from the spirit and scope of the subject matter described herein. Furthermore, the method can be implemented in any suitable hardware, software, firmware, or combination thereof.

At step 702, an identification code associated with a concentrate is read. The concentrate is stored in the cartridge 210 of the vaporizing device 200. The vaporizing device 200 further includes a memory unit for storing the identification code. Examples of the identification code may include, but are not limited to, a numeric code, an alpha-numeric code, a QR code, and a bar code. In an example, the control unit 220 may read the identification stored on the memory unit.

At step 704, the identification code is transmitted to the computing device 300 of the user. For transmitting the identification, the vaporizing device 200 includes the communication unit 224. The communication unit 224, as described earlier, includes the BTLE module and the antenna for transmitting the identification code to the computing device 300.

At step 706, the identification code is received by the central server 400. The central server 400 includes the database 402 having a plurality of identification codes and corresponding concentrate information. In an example, the central server 400 is configured to receive the identification code transmitted by the computing device 300.

At step 708, concentrate information corresponding to the identification code is retrieved. In an example, the central server 400 is configured to retrieve the concentrate information corresponding to the concentrate from the database 402.

At step 710, the concentrate information is transmitted to the computing device 300 for displaying to the user. In an example, the concentrate information is transmitted by the central server 400. On receiving the concentrate information, the computing device 300 may display the concentrate information through a display screen of the computing device 300. In an example, a name of the concentrate along with a chemical composition of the concentrate is displayed. Further, a quantity of concentrate left in the cartridge 210 may also be displayed to the user.

While there is shown and described herein certain specific structures embodying various embodiments of the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A vaporizing device for managing vaporized concentrate usage of a user comprising:
    a housing;
    a removable cartridge received within the housing and configured to store a predefined quantity of concentrate therein, the cartridge comprising an identification code associated with the concentrate and uniquely identifying the cartridge;
    a dosing unit located in the housing and operatively coupled with the cartridge, the dosing unit configured to extrude a known quantity of the concentrate from the cartridge;
    a vaporization chamber defined in the housing and in fluid communication with the cartridge, the vaporization chamber configured to collect the concentrate extruded from the cartridge, the vaporization chamber being disposed physically separate from the cartridge;
    a heating element in thermal communication with the vaporization chamber, the heating element configured to generate heat energy to vaporize the concentrate in the vaporization chamber; and
    a control unit disposed within the housing and configured to read the identification code from the cartridge, the control unit further configured to control the heat energy generated by the heating element based on the identification code of the cartridge.

2. The vaporizing device of claim 1, further including a vapor conduit fluidly connecting the vaporization chamber to a mouthpiece, the vapor conduit separate from the dosing unit.

3. The vaporizing device of claim 1, wherein the identification code is provided by a memory module joined to the cartridge.

4. The vaporizing device of claim 3, wherein the memory module is an electrically erasable programmable read-only memory (EEPROM).

5. The vaporizing device of claim 1, wherein the cartridge further includes a plunger structured and arranged to extrude the concentrate from the cartridge.

6. The vaporizing device of claim 3, wherein the memory module is read by the control unit comprising a processor and code circuitry.

7. The vaporizing device of claim 1, wherein the control unit is in operable control of a communication unit configured to transmit the identification code to a remote computing device, the remote computing device providing the identification code to a central server having a database; wherein the central server is structured and arranged to:
    receive the identification code from the computing device;
    match the identification code to the same identification code in the database;
    retrieve concentrate information corresponding to the matched identification code from the database; and transmit the concentrate information to the remote computing device.

8. The vaporizing device of claim 7, wherein a user installs an application associated with the vaporizing device on the remote computing device, the application providing the user with a graphical user interface for accessing services and operations associated with the vaporizing device.

9. The vaporizing device of claim 7, wherein in addition to transmitting concentrate information, the central server provides additional information for use by the control unit in controlling the heat energy generated by the heating element, the additional information selected from a group consisting of: temperature settings, dosage quantity, and dosage time.

10. The vaporizing device of claim 7, wherein the database further includes user profile data with reference to the identification code of a cartridge disposed within the vaporizing device associated with the user profile data.

11. The vaporizing device of claim 7, wherein the concentrate information further includes information selected from the group consisting of: vaporization temperature settings, dosage quantity, and dosage time.

12. The vaporizing device of claim 11, wherein dosage quantity and/or dosage time is based at least in part on user profile data stored in the central server.

13. A vaporizing device for managing vaporized concentrate usage of a user comprising:
   a housing;
   a removable cartridge disposed within the housing, the cartridge containing a predefined quantity of liquid concentrate therein, the cartridge comprising an identification code uniquely identifying the cartridge, the identification code further identifying the liquid concentrate, the cartridge having an extrusion system to extrude a predetermined amount of the liquid concentrate from an extrusion end of the cartridge;
   a dosing unit structed and arranged to engaged the extrusion system to extrude the predetermined amount of liquid concentrate from the cartridge;
   a vaporization chamber having a heating element in thermal communication therewith, the vaporization chamber disposed in proximity to the extrusion end of the cartridge, the vaporization chamber structured and arranged to collect the liquid concentrate as extruded from the extrusion end of the cartridge, the cartridge physically disposed away from the vaporization chamber to provide thermal isolation of the cartridge from the vaporization chamber; and
   a control unit having a processor coupled to code circuitry to read the identification code from the cartridge, the processor in operative control of the heating element for optimized vaporizing of the extruded concentrate within the vaporization chamber as identified by the identification code.

14. The vaporizing device of claim 13, wherein the cartridge further includes a plunger structured and arranged to extrude the concentrate from the cartridge.

15. The vaporizing device of claim 13, further including a vapor conduit fluidly connecting the vaporization chamber to a mouthpiece, the vapor conduit separate from the dosing unit.

16. The vaporizing device of claim 13, wherein the memory module is read the control unit comprising a processor and code circuitry.

17. The vaporizing device of claim 13, wherein the dosing unit includes a dispensing wheel structured and arranged to translate rotation of the wheel in predefined increments to motion of the extrusion system, each predefined increment of rotation correlating to the extrusion of a predetermined amount of liquid concentrate.

18. The vaporizing device of claim 13, wherein the identification code is provided by a memory module joined to the cartridge.

19. The vaporizing device of claim 18, wherein the memory module is an electrically erasable programmable read-only memory (EEPROM).

20. The vaporizing device of claim 13, wherein the control unit is in operable control of a communication unit configured to transmit the identification code to a remote computing device, the remote computing device providing the identification code to a central server having a database; wherein the central server is structured and arranged to:
   receive the identification code from the computing device;
   match the identification code to the same identification code in the database;
   retrieve concentrate information corresponding to the matched identification code from the database; and
   transmit the concentrate information to the remote computing device.

21. The vaporizing device of claim 20, wherein the database further includes user profile data with reference to the identification code of a cartridge disposed within the vaporizing device associated with the user profile data.

22. The vaporizing device of claim 20, wherein a user installs an application associated with the vaporizing device on the remote computing device, the application providing the user with a graphical user interface for accessing services and operations associated with the vaporizing device.

23. The vaporizing device of claim 20, wherein in addition to transmitting concentrate information, the central server provides additional information for use by the control unit in controlling the heat energy generated by the heating element, the additional information selected from a group consisting of: temperature settings, dosage quantity, and dosage time.

24. The vaporizing device of claim 20, wherein the concentrate information further includes information selected from the group consisting of: vaporization temperature settings, dosage quantity, and dosage time.

25. The vaporizing device of claim 24, wherein dosage quantity and/or dosage time is based at least in part on user profile data stored in the central server.

* * * * *